(12) United States Patent
Elangovan et al.

(10) Patent No.: US 9,968,909 B2
(45) Date of Patent: May 15, 2018

(54) $M^{n+}$-EXCHANGED BETA ZEOLITE, GAS ADSORBENT COMPRISING SAME, METHOD FOR PRODUCING SAME, AND METHOD FOR REMOVING NITROGEN MONOXIDE

(71) Applicant: UNIZEO CO., LTD., Tokyo (JP)

(72) Inventors: Shanmugam Palani Elangovan, Tokyo (JP); Masahiro Yamamoto, Tokyo (JP); Toyohiko Hieda, Tokyo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 124 days.

(21) Appl. No.: 14/897,946

(22) PCT Filed: Jun. 13, 2014

(86) PCT No.: PCT/JP2014/065804
§ 371 (c)(1),
(2) Date: Dec. 11, 2015

(87) PCT Pub. No.: WO2014/200101
PCT Pub. Date: Dec. 18, 2014

(65) Prior Publication Data
US 2016/0144338 A1  May 26, 2016

(30) Foreign Application Priority Data
Jun. 14, 2013 (JP) .................. 2013-125699

(51) Int. Cl.
*B01J 20/18* (2006.01)
*B01D 53/04* (2006.01)
*C01B 39/46* (2006.01)
*B01J 20/28* (2006.01)
*B01D 53/94* (2006.01)
*B01D 53/02* (2006.01)

(52) U.S. Cl.
CPC ............ *B01J 20/186* (2013.01); *B01D 53/02* (2013.01); *B01D 53/9481* (2013.01); *B01J 20/2808* (2013.01); *B01J 20/28061* (2013.01); *B01J 20/28064* (2013.01); *B01J 20/28071* (2013.01); *C01B 39/46* (2013.01); *B01D 53/9454* (2013.01); *B01D 2253/108* (2013.01); *B01D 2253/1085* (2013.01); *B01D 2257/404* (2013.01); *Y02T 10/22* (2013.01)

(58) Field of Classification Search
CPC B01D 53/02; B01D 53/9454; B01D 53/9481; B01D 2253/108; B01D 2253/1085; B01D 2257/404; C01B 3/46; Y02T 10/22; B01J 20/186; B01J 20/28061; B01J 20/28064; B01J 20/28071; B01J 20/2808; B01J 20/18
USPC .......... 95/129, 900, 902; 96/108; 423/239.1, 423/DIG. 27; 502/60, 400
See application file for complete search history.

(56) References Cited

U.S. PATENT DOCUMENTS

| | | | | |
|---|---|---|---|---|
| 5,659,099 A * | 8/1997 | Skeels | ...................... | B01J 29/08 585/430 |
| 5,676,912 A * | 10/1997 | Sharma | ................ | B01D 53/945 423/213.2 |
| 9,656,238 B2 * | 5/2017 | Ogura | ...................... | B01J 20/18 |
| 2001/0014304 A1 | 8/2001 | Satokawa et al. | | |
| 2007/0248517 A1 | 10/2007 | Nagata et al. | | |
| 2009/0048095 A1 | 2/2009 | Li et al. | | |
| 2009/0255236 A1 | 10/2009 | Collier et al. | | |
| 2009/0317307 A1 | 12/2009 | Kanazawa | | |
| 2010/0322847 A1 | 12/2010 | Xiao et al. | | |
| 2011/0286914 A1 * | 11/2011 | Li | ...................... | B01D 53/9418 423/700 |
| 2012/0047874 A1 * | 3/2012 | Schmieg | ............ | B01D 53/9418 60/274 |
| 2012/0190534 A1 * | 7/2012 | Itabashi | .................. | C01B 39/46 502/60 |
| 2014/0157987 A1 | 6/2014 | Ogura et al. | | |
| 2014/0322127 A1 | 10/2014 | Althoff et al. | | |
| 2016/0325228 A1 * | 11/2016 | Feyen | ...................... | B01J 37/04 |

FOREIGN PATENT DOCUMENTS

| | | |
|---|---|---|
| CN | 101325996 A | 12/2008 |
| EP | 0 187 522 A2 | 7/1986 |
| JP | 61-281015 | 12/1986 |
| JP | 2001-64214 A | 3/2001 |
| JP | 2001-286753 A | 10/2001 |
| JP | 2007-76990 A | 3/2007 |
| JP | 2010-502418 A | 1/2010 |
| JP | 2010-527877 A | 8/2010 |
| JP | 2010-536692 A | 12/2010 |
| JP | 2013-49624 A | 3/2013 |
| WO | 2006/011575 A1 | 2/2006 |
| WO | 2011/013560 A1 | 2/2011 |
| WO | 2012/099090 A1 | 7/2012 |

OTHER PUBLICATIONS

Corma et al. "Selective catalytic reduction fo NOx on Cu-beta zeolites". Applied Catalysis B; Environmental 11 (1997), 233-242.*
International Search Report dated Jul. 15, 2014, issued in counterpart International Application No. PCT/JP2014/065804 (2 pages).
Office Action dated Aug. 26, 2016, issued in counterpart Chinese Patent Application No. 201480033723.X. (8 pages).

* cited by examiner

Primary Examiner — Frank Lawrence
(74) Attorney, Agent, or Firm — Westerman, Hattori, Daniels & Adrian, LLP

(57) ABSTRACT

Provided are: a $M^{n+}$-exchanged beta zeolite which is useful for the catalytic removal of nitrogen monoxide contained in a gas to be purified even when oxygen is contained in the gas at a high concentration or when the gas has a low temperature; and a method for producing the $M^{n+}$-exchanged beta zeolite. The $M^{n+}$-exchanged beta zeolite according to the present invention has a $SiO_2/Al_2O_3$ ratio of 7 to 18, and is ion-exchanged by a $M^{n+}$ ion (wherein $M^{n+}$ represents a n-valent metal cation; n represents a numeral value of 1 to 3; and M represents an element selected from the group consisting of Ni, Co, Cu, Mn, Zn, Sn, Ag, Li, K, Cs, Au, Ca, Mg, Pt, Pd, Rh and Ir). The amount of the $M^{n+}$ ion carried on the $M^{n+}$-exchanged beta zeolite is preferably from 0.01 to 2.5 mmol/g relative to the amount of the $M^{n+}$-exchanged beta zeolite.

15 Claims, 7 Drawing Sheets

EXAMPLE 1 (BEFORE EXCHANGE)

EXAMPLE 1 (AFTER EXCHANGE WITH $Ni^{2+}$)

EXAMPLE 1 (AFTER EXCHANGE WITH $Ni^{2+}$)

EXAMPLE 1 (AFTER EXCHANGE WITH $Ni^{2+}$)

EXAMPLE 2 (AFTER EXCHANGE WITH $Co^{2+}$)

EXAMPLE 2 (AFTER EXCHANGE WITH $Co^{2+}$)

COMPARATIVE EXAMPLE 1
(AFTER EXCHANGE WITH $Ni^{2+}$)

COMPARATIVE EXAMPLE 2
(AFTER EXCHANGE WITH $Co^{2+}$)

COMPARATIVE EXAMPLE 2
(AFTER EXCHANGE WITH $Co^{2+}$)

WAVELENGTH (nm)

COMPARATIVE EXAMPLE 3
(AFTER EXCHANGE WITH $Ni^{2+}$)

WAVELENGTH (nm)

$M^{n+}$-EXCHANGED BETA ZEOLITE, GAS ADSORBENT COMPRISING SAME, METHOD FOR PRODUCING SAME, AND METHOD FOR REMOVING NITROGEN MONOXIDE

TECHNICAL FIELD

The present invention relates to an $M^{n+}$-exchanged beta zeolite, a gas adsorbent including the same and a production method therefor. The present invention also relates to an adsorbent for adsorbing and removing nitrogen monoxide gas in a gas phase such as an exhaust gas from an internal combustion engine, and to a method for removing nitrogen monoxide gas from the gas phase.

BACKGROUND ART

It has been proposed that a beta zeolite which has been ion-exchanged with a metal ion is used as a catalyst for purifying an automobile exhaust gas. In Patent Document 1, for example, a denitration catalyst comprising of a carrier that comprises of a beta zeolite having an $SiO_2/Al_2O_3$ molar ratio of 15 to 300, which has been ion-exchanged with 0.1 to 15% by mass of $Fe^{3+}$ ions, and ferric oxide supported on the carrier is described.

In Patent Document 2, it is described that a beta zeolite is made to carry $Fe^{3+}$ by subjecting the beta zeolite to ion-exchange, wherein the beta zeolite has a framework structure of which the content of Si attributed to $Q^4$ species observed by $^{29}Si$ MAS NMR spectrum ranges from 35 to 47% by mass, and wherein $SiO_2/Al_2O_3$ molar ratio is equal to or more than 20 but less than 100, and that the beta zeolite is brought into contact with an exhaust gas containing nitrogen oxides.

Patent Document 3 describes a method for reducing nitrogen oxides ($NO_x$) to $N_2$ in a flowing combustion exhaust gas, which comprises of oxidizing nitrogen monoxide to nitrogen dioxide on a transition metal/zeolite catalyst at catalyst bed temperatures below 50° C. and reducing $NO_x$ with the catalyst using a hydrocarbon (HC) reductant at catalyst bed temperatures below 150° C. Patent Literature 3 describes that examples of the transition metal include, cobalt, manganese, cerium, copper, iron, chromium and a mixture of two or more kinds of them, and the examples of the zeolite catalyst include a beta zeolite catalyst.

Patent Document 4 describes the reduction of nitrogen oxides by using a metal-doped zeolite which has been doped with a metal such as Fe, Co, Ni, Ag, Cu, V, Rh, Pd, Pt and Ir. According to this Document, it is described that an $SiO_2/Al_2O_3$ ratio ranges from 20 to 40, and a commercially available beta zeolite is used as the zeolite in Examples.

Patent Document 1: PCT International Publication No. WO2006/011575

Patent Document 2: Japanese Unexamined Patent Application, Publication No. 2007-076990

Patent Document 3: Japanese Unexamined Patent Application (Translation of PCT Application), Publication No. 2010-502418

Patent Document 4: Japanese Unexamined Patent Application (Translation of PCT Application), Publication No. 2010-527877

DISCLOSURE OF THE INVENTION

Problems to be Solved by the Invention

As described above, though methods for the catalytic removal of nitrogen monoxide by making a zeolite doped with a metal ion have been conventionally known, such methods have been insufficient for removing nitrogen monoxide more efficiently. As a reason for this, the fact that there has been a limitation on the amount of exchange with a metal ion because of the use of a silica-rich zeolite with a high $SiO_2/Al_2O_3$ ratio can be pointed out.

Means for Solving the Problems

As a result of keen examination, the present inventors have found that the above-described problems can be solved by conducting ion-exchange of a beta zeolite having specific physical properties with an n-valent metal such that an $M^{n+}$-exchanged beta zeolite having specific physical properties is obtained.

That is, the present invention provides an $M^{n+}$-exchanged beta zeolite which has been ion-exchanged with an $M^{n+}$ ion (wherein $M^{n+}$ represents an n-valent metal cation; n represents a numerical value of 1 to 3; and M represents an element selected from the group consisting of Ni, Co, Cu, Mn, Zn, Sn, Ag, Li, K, Cs, Au, Ca, Mg, Pt, Pd, Rh and Ir), in which:

$SiO_2/Al_2O_3$ ratio ranges from 7 to 18; a BET specific surface area ranges from 400 to 700 $m^2/g$; a micropore specific surface area ranges from 290 to 500 $m^2/g$; and a micropore volume ranges from 0.15 to 0.25 $m^3/g$.

In addition, the present invention provides a gas adsorbent comprising the above-described $M^{n+}$-exchanged beta zeolite.

Further, the present invention provides a method for producing an $M^{n+}$-exchanged beta zeolite, which comprises the steps of dispersing a beta zeolite, in which an $SiO_2/Al_2O_3$ ratio ranges from 7 to 18, a BET specific surface area that is measured in the form of a sodium-type beta zeolite ranges from 400 to 700 $m^2/g$, a micropore specific surface area that is measured in the form of a sodium-type beta zeolite ranges from 250 to 500 $m^2/g$ and a micropore volume that is measured in the form of a sodium-type beta zeolite ranges from 0.15 to 0.25 $cm^3/g$, in an aqueous solution of a water-soluble compound of an n-valent metal and then mixing the dispersion under stirring to cause the beta zeolite ion-exchanged with an $M^{n+}$ ion (wherein $M^{n+}$ represents an n-valent metal cation; n represents a numerical value of 1 to 3; and M represents an element selected from the group consisting of Ni, Co, Cu, Mn, Zn, Sn, Ag, Li, K, Cs, Au, Ca, Mg, Pt, Pd, Rh and Ir).

Furthermore, the present invention provides a method for removing nitrogen monoxide, which comprises of: bringing an $M^{n+}$-exchanged beta zeolite into contact with nitrogen monoxide or a nitrogen monoxide-containing gas to cause nitrogen monoxide to be adsorbed on the $M^{n+}$-exchanged beta zeolite, wherein, the $M^{n+}$-exchanged beta zeolite has been ion-exchanged with an $M^{n+}$ ion (wherein $M^{n+}$ represents an n-valent metal cation; n represents a numerical value of 1 to 3; and M represents an element selected from the group consisting of Ni, Co, Cu, Mn, Zn, Sn, Ag, Li, K, Cs, Au, Ca, Mg, Pt, Pd, Rh and Ir), and wherein, $SiO_2/Al_2O_3$ ratio ranges from 7 to 18, a BET specific surface area ranges from 400 to 700 $m^2/g$, a micropore specific surface area ranges from 290 to 500 $m^2/g$, and a micropore volume ranges from 0.15 to 0.25 $m^2/g$, in the $M^{n+}$-exchanged beta zeolite.

Effects of the Invention

According to the present invention, an $M^{n+}$-exchanged beta zeolite which is useful for the catalytic removal of nitrogen monoxide and a production method therefor are provided. In particular, according to the present invention, when conducting the catalytic removal of nitrogen monoxide, nitrogen monoxide contained in a gas can be adsorbed and removed more effectively than conventionally known methods.

PREFERRED MODE FOR CARRYING OUT THE INVENTION

Figure 1:
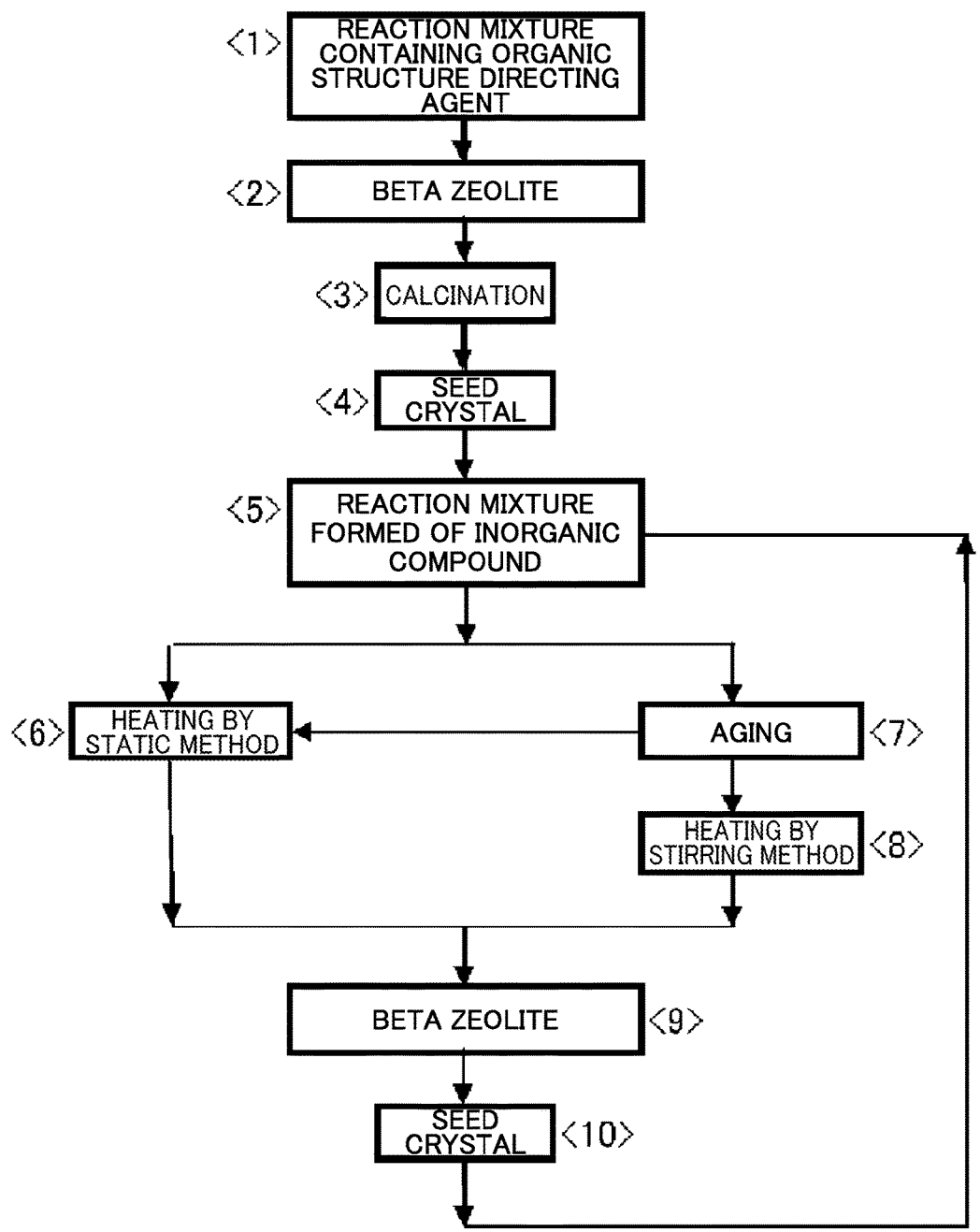
FIG. 1 is a chart of a process for producing a beta zeolite, before $M^{n+}$ exchange that is used in the present invention.

Hereinafter, the present invention will be described based on preferable embodiments. The present invention relates to an $M^{n+}$-exchanged beta zeolite obtained by subjecting a beta zeolite to ion-exchange with an $M^{n+}$ ion. The present invention also relates to a gas adsorbent comprising of the $M^{n+}$-exchanged beta zeolite. The $M^{n+}$ ion is carried on the beta zeolite by being subjected to ion-exchange with a cation present in an $[AlO_2]^-$ site in the beta zeolite. Meanwhile, an $M^{n+}$ ion represents an n-valent metal cation and n represents a numerical value of 1 to 3. In addition, M represents an element selected from the group consisting of Ni, Co, Cu, Mn, Zn, Sn, Ag, Li, K, Cs, Au, Ca, Mg, Pt, Pd, Rh and Ir.

The amount of the $M^+$ contained in the $M^{n+}$-exchanged beta zeolite, that is, the amount of the $M^{n+}$ carried on the $M^{n+}$-exchanged beta zeolite preferably ranges from 0.01 to 2.5 mmol/g, more preferably ranges from 0.05 to 2.3 mmol/g, and even more preferably ranges from 0.1 to 2.0 mmol/g, relative to the amount of the $M^{n+}$-exchanged beta zeolite. When the amount of $M^{n+}$ carried on the $M^{n+}$-exchanged beta zeolite is set within these ranges, the adsorption efficiency of nitrogen monoxide can be effectively improved.

The amount of $M^{n+}$ exchanged, that is, contained in the $M^{n+}$-exchanged beta zeolite is measured by the following method. First, the $M^{n+}$-exchanged beta zeolite to be measured is weighed. The $M^{n+}$-exchanged beta zeolite is dissolved in hydrogen fluoride (HF), and the amount of an n-valent metal in the solution is determined using an inductively coupled plasma emission spectrophotometer. The determined mass of the n-valent metal is divided by the mass of the $M^{n+}$-exchanged beta zeolite, and then further divided by the atomic weight of the n-valent metal, and then multiplied by 1,000 to calculate the amount of $M^{n+}$ carried on (mmol/g), that is, contained in the $M^{n+}$-exchanged beta zeolite.

For the exchange of an $M^{n+}$ ion on a beta zeolite, for example, the following method can be employed. A beta zeolite is dispersed in an aqueous solution of a water-soluble compound of an n-valent metal, followed by mixing under stirring. It is preferable that the beta zeolite is mixed in a proportion of 0.5 to 7 parts by mass based on 100 parts by mass of the above-described aqueous solution. Though the amount of the water-soluble compound of the n-valent metal added may be appropriately set according to the extent of ion-exchange, the amount is preferably from 0.01 to 1.0 mol/L, and is more preferably from 0.1 to 0.5 mol/L, as an aqueous solution of a water-soluble compound of an n-valent metal. Examples of the above-described water-soluble compound include, nitrate, sulfate, phosphate, acetate, chloride, oxide and the like of each of the above-described elements represented by M.

The mixing under stirring may be performed at room temperature or under heating. When the mixing under stirring is performed under heating, it is preferable to set the solution temperature to 10 to 80° C. and is more preferable to set the solution temperature to 10 to 50° C. In addition, the mixing under stirring may be performed under an air atmosphere or under an inert gas atmosphere such as a nitrogen atmosphere.

During the mixing under stirring, a compound which prevents an n-valent metal from being oxidized may be added in water. As such a compound, ascorbic acid, which is a compound that does not hinder the ion-exchange with an $M^{n+}$ ion and can prevent the $M^{n+}$ ion from being oxidized, is preferable. The amount of ascorbic acid added is preferably 0.1 to 3 times, particularly preferably 0.2 to 2 times the amount by mole of the n-valent metal added, in view of effectively preventing oxidization of the n-valent metal.

The time for mixing under stirring may be set such that the $M^{n+}$ ion is stably carried, and it is preferable, for example, that the time is from 2 to 48 hours, and is more preferable that the time is from 5 to 30 hours.

After mixing under stirring is performed for a predetermined time, solid contents are filtered by suction filtration, followed by washing with water and drying, whereby a target $M^{n+}$-exchanged beta zeolite is obtained. The X-ray diffraction diagram of the $M^{n+}$-exchanged beta zeolite is almost the same as the X-ray diffraction diagram of the beta zeolite before an $M^{n+}$ ion-exchange. That is, the crystal structure of the zeolite does not change by the ion-exchange.

In the $M^{n+}$-exchange beta zeolite used in the present invention, $SiO_2/Al_2O_3$ ratio ranges from 7 to 18, and preferably ranges from 7 to 17. In addition, in the $M^{n+}$-exchanged beta zeolite used in the present invention, a BET specific surface area ranges from 400 to 700 $m^2/g$, preferably ranges from 400 to 600 $m^2/g$, and more preferably ranges from 400 to 520 $m^2/g$. Further, in the $M^{n+}$-exchanged beta zeolite used in the present invention, a micropore specific surface area ranges from 290 to 500 $m^2/g$, and preferably ranges from 300 to 480 $m^2/g$. Furthermore, in the $M^{n+}$-exchanged beta zeolite used in the present invention, a micropore volume ranges from 0.15 to 0.25 $cm^3/g$, and preferably ranges from 0.16 to 0.24 $cm^3/g$. The use of the $M^{n+}$-exchanged beta zeolite having these values of physical properties improves adsorption characteristics of nitrogen monoxide. Though the reason is not clear, the present inventors think that the beta zeolite used in the present invention can carry a larger amount of the $M^{n+}$ ion than conventionally used beta zeolites because more exchangeable cations present in the beta zeolite, as it has more number of $[AlO_2]^-$ site, are ion-exchanged with $M^{n+}$ ions due to the use of an aluminum-rich beta zeolite having $SiO_2/Al_2O_3$ ratio ranging from 7 to 18, and preferably ranging from 7 to 17. Meanwhile, as will be described below, these values of physical properties are not greatly different from the corresponding values of physical properties of the beta zeolite before having been ion-exchanged with the $M^{n+}$ ion.

Features of the $M^{n+}$-exchanged beta zeolite used in the present invention include that its spectrum of the intensity of the Kubelka-Munk function $f(R\infty)$ obtained by Ultraviolet-visible spectroscopy shows specific peaks, in addition to that it has the above-described specific values of the $SiO_2/Al_2O_3$ ratio, the BET specific surface area, the micropore specific surface area and the micropore volume. Specifically, the $M^{n+}$-exchanged beta zeolite used in the present invention is characterized in that the intensity of the Kubelka-Munk function $f(R\infty)$ obtained by Ultraviolet-visible spectroscopy shows the maximal intensity in the wavelength range from 300 to 600 nm which is larger than the maximal intensity in the wavelength range from 200 to 250 nm. On the contrary, conventional $M^{n+}$-exchanged beta zeolites are inverse thereto, that is, the conventional $M^{n+}$-exchanged beta zeolites show the maximal intensity in the wavelength range from 300 to 600 nm which is smaller than the maximal intensity in the wavelength range from 200 to 250 nm.

The intensity of the Kubelka-Munk function $f(R\infty)$ can be calculated by performing the Kubelka-Munk conversion to convert the diffuse reflectance $(r\infty)$ of an $M^{n+}$-exchanged beta zeolite to the intensity of the Kubelka-Munk function $f(R\infty)$ according to the following equation.

$$f(R\infty)=(1-r\infty)^2/2r\infty$$

The present inventors think that the state of an element M in an $M^{n+}$-exchanged beta zeolite can be speculated based on the spectrum of the intensity of the Kubelka-Munk function $f(R\infty)$. In addition, the present inventors speculate that the fact that the $M^{n+}$-exchanged beta zeolite according to the present invention shows the maximal intensity in the wavelength range from 300 to 600 nm which is larger than the maximal intensity in the wavelength range from 200 to 250 nm reflects the state in which the amount of the element M present as an aggregate in the $M^{n+}$-exchanged beta zeolite is equal to or larger than a certain amount. The aggregate is supposed to be present, for example, on the surface of the zeolite, as agglomerated elements M which are not exchanged with a cation present in an $[AlO_2]^-$ site in the zeolite structure. In general, it is thought to be better that the amount of the element M present in such a form of an aggregate is smaller, from the point of view of the adsorption efficiency of nitrogen monoxide by a beta zeolite. However, the $M^{n+}$-exchanged beta zeolite according to the present invention is characterized by a high adsorption efficiency of nitrogen monoxide, in spite of having the above-described properties. Specifically, a spectrum of the intensity of the Kubelka-Munk function $f(R\infty)$ can be obtained by a method used in Examples described hereinafter.

Further, another feature of the $M^{n+}$-exchanged beta zeolite used in the present invention is that it tends to react more easily with hydrogen than conventional $M^{n+}$-exchanged beta zeolites, at a low temperature. Specifically, when raising the temperature of the $M^{n+}$-exchanged beta zeolite used in the present invention at the rate of 10° C./min under the mixed gas atmosphere consisting of 5 vol % of hydrogen and 95 vol % of helium, the hydrogen consumption amount by the $M^{n+}$-exchanged beta zeolite preferably has a peak at a temperature of 400° C. or less, and more preferably has a peak at a temperature of 390° C. or less.

The above-described method for evaluating the hydrogen consumption amount is also referred to as an $H_2$-TPR (Temperature programmed Reduction) method. The reasons for the tendency of the $M^{n+}$-exchanged beta zeolite used in the present invention to react easily with hydrogen at a low temperature are thought to be correlated with the fact that the $M^{n+}$-exchanged beta zeolite has a lower $SiO_2/Al_2O_3$ ratio than conventional $M^{n+}$-exchanged beta zeolites such that the locations of $[AlO_2]^-$ sites in the beta zeolite are different from those of conventional beta zeolites, the fact that the amount of the $M^{n+}$ ion carried on the $M^{n+}$-exchanged beta zeolite is different from those of conventional beta zeolites, and the like. Specifically, the above-described hydrogen consumption amount can be measured by the measurement method used in Examples described hereinafter.

The $M^{n+}$-exchanged beta zeolite used in the present invention is particularly excellent in the trap performance of nitrogen monoxide discharged at cold start of an internal-combustion engine. Since the temperature of a three-way catalyst is not sufficiently high at cold start of a gasoline engine or a diesel engine, it is difficult to effectively purify an exhaust gas by the three-way catalyst. However, in addition to the three-way catalyst, by using an adsorbent (catalyst) containing the $M^{n+}$-substituted beta zeolite used in the present invention, it is possible to trap nitrogen monoxide contained in the exhaust gas that is at a relatively low temperature at the time of cold start, whereby the exhaust gas can be purified. When several minutes elapses from the cold start, and the temperature reaches the vicinity of the operating temperature of the three-way catalyst, nitrogen monoxide that has been trapped in the $M^{n+}$-substituted beta zeolite used in the present invention is released, and the released nitrogen monoxide is purified by the three-way catalyst which has reached the operating temperature.

In addition, the $M^{n+}$-exchanged beta zeolite used in the present invention can effectively adsorb and remove nitrogen monoxide even when oxygen is contained in a gas to be purified at a high concentration.

In the present invention, it is preferable to use a beta zeolite having specific values of physical properties for the beta zeolite that is a zeolite which is to be ion-exchanged with an $M^{n+}$ ion. In detail, one of the characteristics of the beta zeolite used in the present invention (hereinafter, this zeolite will be referred to as "a beta zeolite before $M^{n+}$-exchange" so as to be compared with the $M^{n+}$-exchanged beta zeolite) is that though it has a low $SiO_2/Al_2O_3$ ratio and is rich in aluminum, the beta zeolite before $M^{n+}$-exchange has a large BET specific surface area, a large micropore specific surface area and a high micropore volume. Beta zeolites having a low $SiO_2/Al_2O_3$ ratio are known so far, but a BET specific surface area, a micropore specific surface area or a micropore volume of these beta zeolites is not large. In order to increase the BET specific surface area, the micropore specific surface area and the micropore volume of conventionally known beta zeolites, the $SiO_2/Al_2O_3$ ratio must be increased.

In the beta zeolite before $M^{n+}$-exchange, the $SiO_2/Al_2O_3$ ratio ranges from 7 to 18, and preferably ranges from 7 to 17, so the zeolite is rich in aluminum. In such an aluminum-rich beta zeolite before $M^{n+}$-exchange, a BET specific surface area that is measured in the form of a sodium-type beta zeolite ranges from 400 to 700 m²/g, and preferably ranges from 450 to 700 m²/g, which are high values. In addition, in such an aluminum-rich beta zeolite before $M^{n+}$-exchange, a micropore specific surface area that is measured in the form of a sodium-type beta zeolite ranges from 250 to 500 m²/g, and preferably ranges from 300 to 500 m²/g, which are high values. Further, in such an aluminum-rich beta zeolite before $M^{n+}$-exchange, a micropore volume that is measured in the form of a sodium-type beta zeolite ranges from 0.15 to 0.25 cm³/g, and preferably ranges from 0.16 to 0.25 cm³/g, which are high values.

As described above, the $SiO_2/Al_2O_3$ ratio, the values of the BET specific surface area, the micropore specific surface area and the micropore volume in the beta zeolite before $M^{n+}$-exchange are not greatly different from the corresponding values in the $M^{n+}$-exchanged beta zeolite.

The beta zeolite before $M^{n+}$-exchange encompasses a sodium-type zeolite and further encompasses one that becomes an $H^+$-type zeolite by ion-exchange of sodium ions with protons. When the beta zeolite is an $H^+$-type, the above-described specific surface area and the like are measured after protons are exchanged with sodium ions. In order to convert the sodium-type beta zeolite to the $H^+$-type, for example, the sodium-type beta zeolite is dispersed in an aqueous solution of an ammonium salt such as ammonium nitrate to substitute sodium ions in the zeolite with ammonium ions. The ammonium-type beta zeolite is calcined, and thereby the $H^+$-type beta zeolite is obtained.

The above-described specific surface area and volume are measured using a BET specific surface area measuring device as described in the following Examples.

The aluminum-rich beta zeolite before $M^{n+}$-exchange having the above-described physical properties is suitably produced by a production method described below. In the present invention, the reason why the beta zeolite before $M^{n+}$-exchange could achieve the above-described physical properties is because it was presumed to have been able to suppress the occurrence of defects that may occur in the crystal structure of the beta zeolite before $M^{n+}$-exchange obtained by using the production method, but the detail thereof is not clear.

Next, a preferable method for producing the beta zeolite before $M^{n+}$-exchange will be described with reference to FIG. 1. In FIG. 1, a conventional synthesis method of a beta zeolite that uses an organic SDA is performed in the order of <1>, <2>, and <3>. In addition, a method performed in the order of <1>, <2>, <3>, <4>, <5>, <6>, and <9> is also known (for example, the specification of Chinese Patent Application No. 101249968A (hereinafter, also referred to as a "the conventional method")). In the conventional method, the use of a seed crystal is essential, and for producing the seed crystal, tetraethylammonium ion which is an organic compound is essentially used as a structure directing agent (hereinafter, also referred to as "SDA"). In addition, in order to use the beta zeolite obtained by the conventional method as a seed crystal, it is required to remove tetraethylammonium ion by calcining the zeolite at a high temperature.

In contrast to this method, a beta zeolite before $M^{n+}$-exchange can be produced in six different ways of method in the present invention. The first method is a method that is performed in the order of <1>, <2>, <3>, <4>, <5>, <6>, and <9> just like the conventional method. Here, this method differs from the conventional method, in terms of the $SiO_2/Al_2O_3$ ratio of the seed crystal and the composition of the reaction mixture. Therefore, according to the present invention, it is possible to produce a beta zeolite before $M^{n+}$-exchange having a wide range of $SiO_2/Al_2O_3$ ratios.

The second method is a method that is performed in the order of <1>, <2>, <3>, <4>, <5>, <7>, <6>, and <9>. In this method, after aging is performed, heating is conducted in a static state, whereby a seed crystal having a low $SiO_2/Al_2O_3$ ratio can be effectively used.

The third method is a method that is performed in the order of <1>, <2>, <3>, <4>, <5>, <7>, <8>, and <9>. This method differs from the conventional method, in terms of the $SiO_2/Al_2O_3$ ratio of the seed crystal and the composition of the reaction mixture.

The present production method can also be performed in the following three types of orders.
<10>, <5>, <6>, <9>
<10>, <5>, <7>, <6>, <9>
<10>, <5>, <7>, <8>, <9>

The $SiO_2/Al_2O_3$ ratio of the seed crystal and the composition of the reaction mixture in these cases are also different from those of the conventional method. In addition, in these three methods, the beta zeolite before $M^{n+}$-exchange obtained by the method of the present invention is used as a seed crystal. That is, in these three production methods, a seed crystal can be repeatedly used, and therefore, an organic SDA is fundamentally not used. To summarize, these three production methods can be said to be methods for producing a beta zeolite which are performed by a green process resulting in the ultimately small burden on the environment.

The method for producing a beta zeolite before $M^{n+}$-exchange used in the present invention will be described in more detail. The method performed in the order of <1>, <2>, and <3> in FIG. 1 is the same as the conventional method that uses an organic SDA. Regarding the seed crystal of <4> in FIG. 1, in the conventional method, the range of the $SiO_2/Al_2O_3$ ratio of the seed crystal is limited within a narrow range such as a range from 22 to 25. On the other hand, one of the characteristics of the present production method is the $SiO_2/Al_2O_3$ ratio of the seed crystal shown in <4> in FIG. 1. In the present production method, it is possible to use a seed crystal having a $SiO_2/Al_2O_3$ ratio within a range from 8 to 30. It is extremely difficult to synthesize a beta zeolite in which $SiO_2/Al_2O_3$ ratio of a seed crystal is less than 8, so such a seed crystal is not used in general. Further, when the $SiO_2/Al_2O_3$ ratio of a seed crystal exceeds 30, the product tends to become ZSM-5 easily without depending on the composition of the reaction mixture. Furthermore, in the present production method, the amount of the seed crystal added is within a range from 0.1 to 20% by mass, based on the amount of the silica component contained in the reaction mixture. It is preferable that the amount of the seed crystal added is small, but the amount of the seed crystal added is determined considering the reaction rate, the effect of suppressing impurities, and the like. The amount of the seed crystal added is preferably 1 to 20% by mass, and is more preferably 1 to 10% by mass.

The average particle size of the seed crystal of the beta zeolite used in the present production method is 150 nm or larger, preferably ranges from 150 nm to 1,000 nm, and even more preferably ranges from 200 nm to 600 nm. The size of the crystal of a beta zeolite before $M^{n+}$-exchange obtained by synthesis is not uniform in general, and has a certain degree of particle size distribution. It is not difficult to determine a crystal particle size having the maximum frequency in the particle size distribution. The average particle size refers to a particle diameter of a crystal having the maximum frequency when being observed by a scanning electron microscope. The average particle size of the beta zeolite obtained by using an organic SDA is generally small and is within a range from 100 nm to 1,000 nm in general. However, there are also particles of which particle sizes are unclear and those of which particle sizes are larger than 1,000 nm, since small particles are aggregated together. In addition, in order to synthesize a crystal having a particle size equal to or smaller than 100 nm, a special device might be required, and it might cost a lot. Accordingly, in the present production method, a beta zeolite having an average particle size of 150 nm or larger is used as a seed crystal. The average particle size of the beta zeolite before $M^{n+}$-exchange obtained by the present production method is also within this range, and therefore, the beta zeolite can be suitably used as a seed crystal.

The reaction mixture to which a seed crystal is added is obtained, for example, by mixing a silica source, an alumina source, an alkali source and water, such that the mixture has the composition represented by the following molar ratio. When the composition of the reaction mixture is out of this range, an intended beta zeolite before $M^{n+}$ exchange cannot be easily obtained.

$SiO_2/Al_2O_3$=6 to 40
$Na_2O/SiO_2$=0.05 to 0.25
$Li_2O/SiO_2$=0.005 to 0.25
$H_2O/SiO_2$=5 to 50

A more preferable range of the composition of the reaction mixture is as follows.

$SiO_2/Al_2O_3$=10 to 40
$Na_2O/SiO_2$=0.1 to 0.25
$Li_2O/SiO_2$=0.01 to 0.15
$H_2O/SiO_2$=10 to 25

Examples of the silica source used for obtaining the reaction mixture having the above-described molar ratio include silica itself and a silicon-containing compound which can generate a silicate ion in water. Specific examples thereof include wet-process silica, dry-process silica, colloidal silica, sodium silicate, an aluminosilicate gel, and the like. One kind of these silica sources can be used alone, or two or more kinds thereof can be used in combination. It is preferable to use silica (silicon dioxide) among these silica sources, since it is possible to obtain a zeolite without producing unwanted by-products.

As the alumina source, for example, a water-soluble aluminum-containing compound can be used. Specific examples thereof include sodium aluminate, aluminum nitrate, aluminum sulfate, and the like. In addition, aluminum hydroxide is also one of the preferable alumina sources. One kind of these alumina sources can be used alone, or two or more kinds thereof can be used in combination. It is preferable to use sodium aluminate or aluminum hydroxide among these alumina sources, since it is possible to obtain a zeolite without producing unwanted by-products (for example, sulfate or nitrate and the like).

As the alkali source, in the case of sodium, for example, sodium hydroxide can be used. As the alkali source, in the case of lithium, a lithium halide such as lithium chloride and lithium bromide as well as lithium salts such as lithium acetate can be used, or lithium hydroxide can be used. Meanwhile, when sodium silicate is used as the silica source or when sodium aluminate is used as the alumina source, sodium as an alkali metal component contained therein is considered at the same time as NaOH as well and it is also an alkaline component. Accordingly, the amount of the above-described $Na_2O$ is calculated as the sum of the amounts of all alkaline components in the reaction mixture.

When a reaction mixture having the following composition is used, it is possible to obtain an intended beta zeolite before $M^{n+}$-exchange even though the reaction mixture does not contain a lithium ion.

$SiO_2/Al_2O_3$=40 to 200
$Na_2O/SiO_2$=0.22 to 0.4
$H_2O/SiO_2$=10 to 50

An even more preferable range of the composition of the reaction mixture is as follows.

$SiO_2/Al_2O_3$=44 to 200
$Na_2O/SiO_2$=0.24 to 0.35
$H_2O/SiO_2$=15 to 25

It is also preferable to employ the following range for the composition of the reaction mixture.

$SiO_2/Al_2O_3$=10 to 40
$Na_2O/SiO_2$=0.05 to 0.25
$H_2O/SiO_2$=5 to 50

An even more preferable range of the composition of the reaction mixture is as follows.

$SiO_2/Al_2O_3$=12 to 40
$Na_2O/SiO_2$=0.1 to 0.25
$H_2O/SiO_2$=10 to 25

With regard to the order of the addition of each raw material in a method for preparing the reaction mixture, a method by which a uniform reaction mixture is easily obtained may be employed. For example, an alumina source is added and dissolved in an aqueous solution of sodium hydroxide at room temperature, and then a silica source is added thereto, followed by mixing under stirring, whereby a uniform reaction mixture can be obtained. In particular, when lithium is used in a reaction mixture, a lithium source may be added and dissolved together with an alumina source into an aqueous solution of sodium hydroxide, and then a silica source may be added thereto, followed by mixing under stirring, whereby a uniform reaction mixture can be obtained. A seed crystal is added thereto while being mixed with the silica source or after the silica source is added. Thereafter, the solution is stirred and mixed such that the seed crystal is uniformly dispersed. The temperature for preparing the reaction mixture is not particularly limited, and in general, the preparation may be performed at room temperature (20 to 25° C.)

The reaction mixture containing the seed crystal is put into a sealed container and the reaction is performed by heating, whereby a beta zeolite is crystallized. No organic SDA is contained in the reaction mixture. As a method for performing crystallization, the reaction mixture is heated in a static state, that is, by a static method, without conducting aging, as shown in the conventional method (the order of <4>, <5>, <6>, and <9>).

On the other hand, when a seed crystal having a low $SiO_2/Al_2O_3$ ratio is used, the crystallization tends to occur easily when the reaction mixture is heated without being stirred, after conducting aging (the order of <4>, <5>, <7>, <6>, and <9>). Aging refers to an operation of holding the reaction mixture at a temperature lower than the reaction temperature for a certain period of time. During aging, in general, the reaction mixture is allowed to be in a static state without being stirred. It is known that by conducting aging, effects of preventing production of impurities as by-products, make it possible to perform heating under stirring without producing impurities as by-products, by increasing the reaction rate, and the like are exerted, but the mechanisms of action thereof are not necessarily clear. The temperature and time of aging are set such that the above-described effects are exerted to the maximum extent. In the present production method, aging is conducted preferably at 20 to 80° C. and more preferably at 40 to 80° C., preferably in the range from 2 hours to 1 day.

When the reaction mixture is stirred so as to achieve the uniform temperature of the reaction mixture during heating, it is possible to prevent impurities from being produced as by-products by performing heating under stirring after conducting aging (the order of <4>, <5>, <7>, <8>, and <9>). Stirring is performed in order to achieve the uniform composition and the uniform temperature of the reaction mixture, and examples of the stirring operation include mixing performed by a stirring blade, or mixing by the rotation of the container, and the like. The stirring strength or the rotation speed may be adjusted according to the uniformity of the temperature, to the degree of the production of impurities as by-products, and the like. Stirring may be performed intermittently but not continuously. By combining aging and stirring in this way, industrial mass production can be realized.

The following three methods are methods for producing a beta zeolite before $M^{n+}$-exchange which are performed by a green process that is a characteristic of the present production method. According to these three methods, the beta zeolite before $M^{n+}$-exchange obtained by the present production method can be reproduced infinitely by using itself as a seed crystal, and a production process not using an organic SDA at all can be realized. That is, the methods include a method performed in the order of <10>, <5>, <6>, and <9>, a method performed in the order of <10>, <5>, <7>, <6>, and <9>, as well as a method performed in the order of <10>, <5>, <7>, <8>, and <9>. The characteristics of the respective steps are as described above. The $SiO_2/Al_2O_3$ ratio of the beta zeolite before $M^{n+}$-exchange obtained by the present production method preferably ranges from 8 to 30. When the beta zeolite before $M^{n+}$-exchange obtained by the present production method is used as a seed crystal, the beta zeolite can be crystallized without conducting the aging operation in the case where the zeolite is synthesized in a static state, even though the $SiO_2/Al_2O_3$ ratio thereof is low. When a beta zeolite synthesized using the organic SDA is used as a seed crystal, the zeolite is used after being calcined, but when the beta zeolite before $M^{n+}$-exchange obtained by the present production method is used as a seed crystal, it does not need to be calcined. Presumably, this difference may make a difference in the effect of the zeolite as a seed crystal, but the detail thereof is unclear. However, when heating under stirring is performed, it is preferable to conduct aging.

In both the static method and stirring method, the heating temperature ranges from 100 to 200° C., preferably ranges from 120 to 180° C., and the heating is conducted at autogenous pressure. When the temperature is lower than 100° C., the crystallization rate becomes extremely low, and therefore, the efficiency in generating the beta zeolite tends to become poor. On the other hand, when the temperature exceeds 200° C., an autoclave having a high degree of pressure resistance is required, and therefore, not only the economic efficiency tends to become deficient, but also impurities tend to be generated at a high rate. The heating time is not critical in the present production method, and heating may be performed until a beta zeolite having a sufficiently high degree of crystallinity is generated. In general, a beta zeolite before $M^{n+}$-exchange that has satisfactory crystallinity is obtained by conducting heating for about 5 to 150 hours.

In the present production method, when the heating time is insufficient, amorphous components tend to be also generated. In addition, when heating is further continued after the completion of crystallization of the beta zeolite, mordenite starts to grow, whereby the proportion of the beta zeolite tends to decrease. The time for which only an intended beta zeolite before $M^{n+}$-exchange is stably present as a monophase varies depending on the temperature, but it is not long in general. In order to obtain a monophase beta zeolite, heating is completed before mordenite starts to grow, and the sealed container is cooled to terminate the reaction.

The crystal of the beta zeolite before $M^{n+}$-exchange is obtained by the above-described heating. After completion of heating, the generated crystalline powder is separated from the mother liquor by filtration, and thereafter, it is washed with water or warm water, and then is dried. The crystal in a dried state does not contain any organic matter, and therefore, it does not need to be calcined.

The beta zeolite before $M^{n+}$-exchange obtained in this manner is ion-exchanged with an $M^{n+}$ ion as described above, whereby an $M^{n+}$-exchanged beta zeolite is obtained. The $M^{n+}$-exchanged beta zeolite may be used as it is as an adsorbent of nitrogen monoxide or as a gas adsorbent containing the $M^{n+}$-exchanged beta zeolite. Regardless of the form of the $M^{n+}$-exchanged beta zeolite, nitrogen monoxide can be adsorbed onto the $M^{n+}$-exchanged beta zeolite, by bringing the $M^{n+}$-exchanged beta zeolite into contact with nitrogen monoxide in a manner of solid-gas contact.

In the present invention, nitrogen monoxide gas itself is brought into contact with the $M^{n+}$-exchanged beta zeolite such that nitrogen monoxide gas is adsorbed onto the zeolite. In addition, a gas containing nitrogen monoxide gas can be brought into contact with the $M^{n+}$-exchanged beta zeolite such that nitrogen monoxide gas contained in the gas is adsorbed onto the zeolite, whereby the nitrogen monoxide gas can be removed from the gas. Examples of such a gas include an exhaust gas from an internal combustion engine that uses hydrocarbon such as gasoline and light oil as a fuel, an exhaust gas generated from various types of boilers or incinerators, and the like.

EXAMPLES

Hereinafter, the present invention will be described in more detail based on Examples. However, the scope of the present invention is not limited to such Examples. Unless otherwise specified, "%" means "% by mass". Meanwhile, analytical instruments and analytical methods used in the following Examples, Comparative Examples, and Reference Examples below are as follows.

Powder X-ray diffractometer: Powder X-ray diffractometer Ultima IV, manufactured by Rigaku Corporation, using a Cukα ray, a voltage of 40 kV, a current of 40 mA, a scan step of 0.02°, a scan speed of 2°/min.

$SiO_2/Al_2O_3$ ratio: A beta zeolite was dissolved in hydrogen fluoride (HF) and the solution was analyzed using ICP to quantify Al. In addition, a beta zeolite was dissolved in potassium hydroxide (KOH) and the solution was analyzed using ICP to quantify Si. The $SiO_2/Al_2O_3$ ratio was calculated based on the quantified amounts of Si and Al.

Measuring device for BET specific surface area, micropore specific surface area and micropore volume: AUTOSORB-1 manufactured by Quantachrome Instruments.

Measuring device for spectrum of the intensity of the Kubelka-Munk function f (R∞) obtained by Ultraviolet-visible spectroscopy: Hitachi Fluorescence Spectrophotometer F-7000 manufactured by Hitachi High-Technologies Corporation.

The above-described intensity of the Kubelka-Munk function f (R∞) was obtained as follows.

A quartz cell (width 25 mm×height 40 mm×thickness 5 mm) was filled with an $M^{n+}$-exchanged beta zeolite, and light in the UV-visible region (200 to 800 nm) was irradiated to the measurement area (diameter φ 20 mm: 3.14 cm²) of the quartz cell, and then a diffuse reflection spectrum from the sample was obtained by conducting the measurement with synchronizing the wavelength of detector with that of the incident light. Thus obtained diffuse reflection spectrum was divided by a spectrum of a blank to calculate the diffuse reflectance (r∞), and thereafter, the intensity of the Kubelka-Munk function f (R∞) which shows an absorption amount of the sample was calculated according to the Kubelka-Munk equation.

Measuring device for hydrogen consumption amount: BEL-CAT manufactured by BEL JAPAN, INC.

The above-described hydrogen consumption amount was measured as follows.

An arbitrary amount of an $M^{n+}$-exchanged beta zeolite was dried in helium gas at 500° C., and thereafter, hydrogen was made to be adsorbed in a mixed gas of hydrogen/helium (hydrogen: 5 vol %/helium: 95 vol %) at 100° C. Next, the sample was heated from room temperature to 800° C. at the heating rate of 10° C./min, and the behavior of hydrogen desorption was detected by using a thermal conductivity detector (TCD) as a hydrogen consumption amount (arbitrary unit), whereby a variation curve of the hydrogen consumption amount versus temperature was obtained.

Example 1

Figure 2:
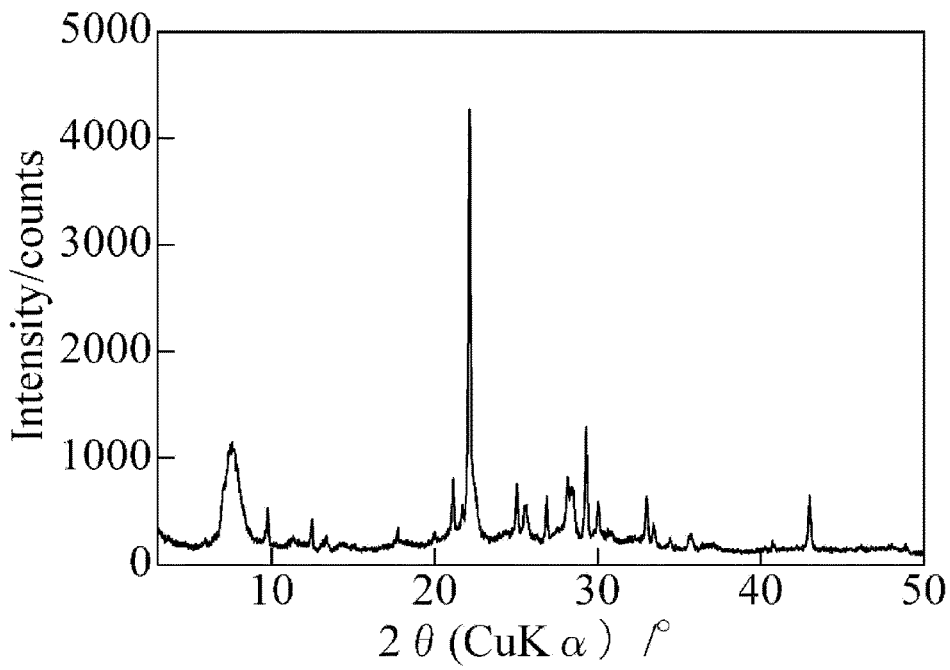
FIG. 2 is an X-ray diffraction diagram of a beta zeolite before $M^{n+}$ exchange that was obtained in Example 1.

(1) Production of Beta Zeolite Before $M^{n+}$-Exchange 0.477 g of sodium aluminate, 0.822 g of 36% sodium hydroxide and 0.141 g of lithium hydroxide monohydrate were dissolved in 14.54 g of pure water to give an aqueous solution. A mixture of 2.017 g of pulverized silica and 0.202 g of a seed crystal of a calcined beta zeolite having an $SiO_2/Al_2O_3$ ratio of 24.0 was added little by little to the above-described aqueous solution, and the resulting mixture was stirred and mixed to give a reaction mixture having a composition in which $SiO_2/Al_2O_3=20$, $Na_2O/SiO_2=0.175$, $Li_2O/SiO_2=0.05$ and $H_2O/SiO_2=25$. The reaction mixture was put into a 60 cc sealed container made of stainless steel and then aging was conducted at 80° C. for 16 hours. Thereafter, the reaction mixture was heated in a static state at 150° C. at autogenous pressure for 72 hours without being stirred. After the sealed container was cooled, the product was filtered and washed with warm water to give a white powder. The X-ray diffraction diagram of the product is shown in FIG. 2. As seen in FIG. 2, the product was a beta zeolite not containing an impurity. The values of physical properties of the beta zeolite before $M^{n+}$-exchange thus obtained are shown in Table 1. The seed crystal of a beta zeolite was obtained using SDA by the following method.

[Method for Producing Seed Crystal of Beta Zeolite]

A beta zeolite having an $SiO_2/Al_2O_3$ ratio of 24.0 was synthesized by using a conventionally known method that uses tetraethylammonium hydroxide as an SDA, sodium aluminate as an alumina source, and pulverized silica (Mizukasil P707) as a silica source, and by performing heating under stirring at 165° C. for 96 hours. The zeolite was calcined at 550° C. for 10 hours in an electric furnace under air flow to produce a crystal containing no organic matter. From the result of X-ray diffraction, the crystal was confirmed to be a beta zeolite. The crystal was observed with a scanning electron microscope, and as a result, an average particle size thereof was 280 nm. This beta zeolite contained no SDA.

Figure 3:
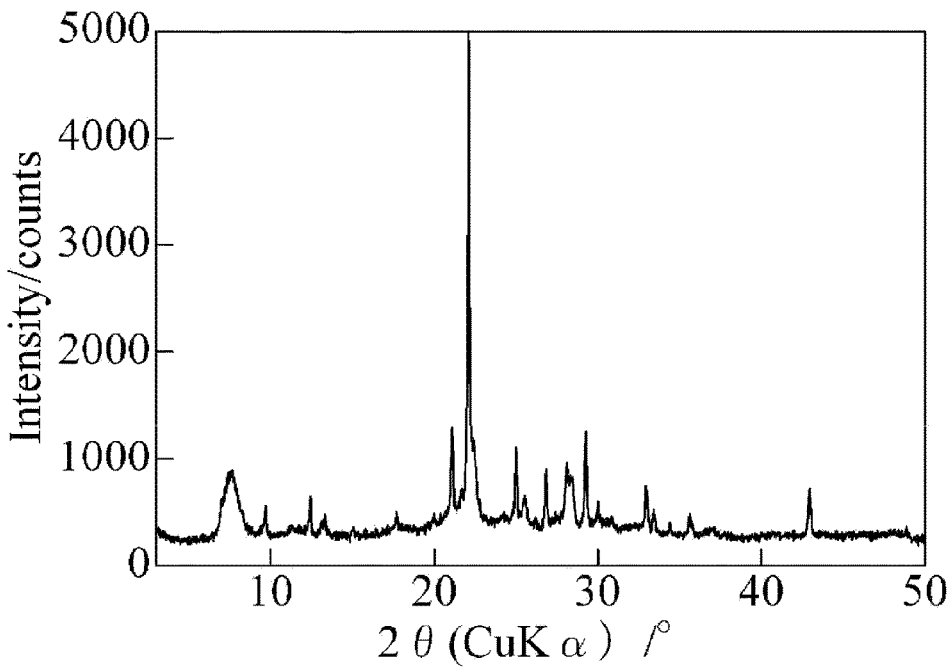
FIG. 3 is an X-ray diffraction diagram of a $Ni^{2+}$-exchanged beta zeolite that was obtained in Example 1.
Figure 4:
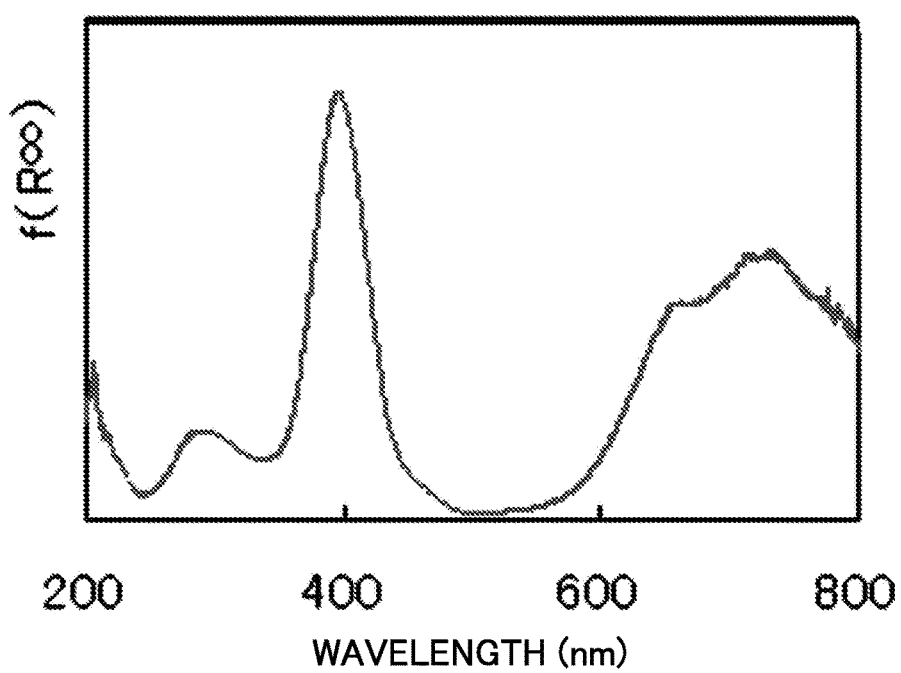
FIG. 4 is a spectrum of a $Ni^{2+}$ beta zeolite that was obtained in Example 1 as a function of Kubelka-Munk.
Figure 5:
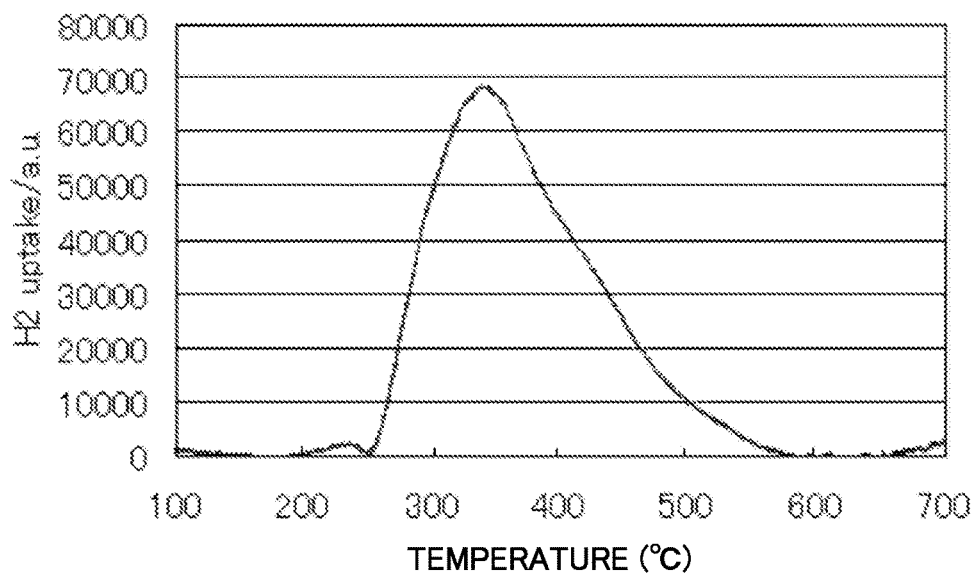
FIG. 5 shows hydrogen uptake of a $Ni^{2+}$ beta zeolite that was obtained in Example 1.

(2) Production of $Ni^{2+}$-Exchanged Beta Zeolite 30 ml of an aqueous solution of 0.3 mol/L of Ni $(NO_3)_2 \cdot 6H_2O$ and 2.00 g of a beta zeolite before $M^{n+}$-exchange were put in a polypropylene container, followed by stirring at room temperature for 1 day. Thereafter, the precipitate was filtered by suction filtration, washed with distilled water, and dried to give a $Ni^{2+}$-exchanged beta zeolite on which 1.01 mmol/g of $Ni^{2+}$ was carried. The amount of $Ni^{2+}$ carried on the $Ni^{2+}$-exchanged beta zeolite was measured by using an inductively coupled plasma emission spectrophotometer (ICP-AES, LIBERTY Series II manufactured by Varian Medical Systems (Varian Technologies)). The X-ray diffraction diagram of the obtained $Ni^{2+}$-exchanged beta zeolite is shown in FIG. 3. When FIG. 3 ($Ni^{2+}$-exchanged beta zeolite) and FIG. 2 (beta zeolite $M^{n+}$-exchange) were compared each other, it was observed that the peak positions and peak intensities did not substantially change. Therefore, it was confirmed that the structure of the beta zeolite was maintained even after ion-exchange. In addition the spectrum of the intensity of the Kubelka-Munk function f (R∞) of the obtained $Ni^{2+}$-exchanged beta zeolite is shown in FIG. 4. As shown in FIG. 4, this spectrum of the intensity of the Kubelka-Munk function f (R∞) had the maximal intensity in the wavelength range from 300 to 600 nm which was larger than the maximal intensity in the wavelength range from 200 to 250 nm. Specifically, the maximal intensity in the wavelength range from 200 to 250 nm was 0.0128, and the maximal intensity in the wavelength range from 300 to 600 nm was 0.0345. Further, the variation curve of the hydrogen consumption amount of the obtained $Ni^{2+}$-exchanged beta zeolite is shown in FIG. 5. As shown in FIG. 5, the hydrogen consumption amount of the $Ni^{2+}$-exchanged beta zeolite has a peak around 330 to 350° C.

(3) Evaluation of Nitrogen Monoxide Gas Adsorption

Using an electronic balance, 20 mg of the $Ni^{2+}$-exchanged beta zeolite was weighed accurately, and then 180 mg of silicon carbide, which was used as a diluent, was uniformly mixed with the $Ni^{2+}$-exchanged beta zeolite. The mixture was filled in a quartz glass tube having an inner diameter of 6 mm. Water adsorbed during mixing was removed by being heated with a mantle heater, and then the mixture was cooled to room temperature. Thereafter, 5 cm³ of 1030 ppm of nitrogen monoxide gas was pulsed into the quartz glass tube every 2 minutes at room temperature. The amount of nitrogen monoxide gas that came out of the quartz glass tube without being adsorbed was calculated from the peak area of a thermal conductivity-type gas chromatograph (GC-TCD, GC-8A, manufactured by Shimadzu Corporation) and values detected by a chemoluminescence-type NO analyzing device (NOx analyzer, ECL-77A, manufactured by Yanagimoto Manufacturing Co., Ltd. (ANATEC YANACO CORPORATION)). Measurement conditions of the thermal conductivity-type gas chromatograph (GC-TCD) were as follows. Then, the calculated value was subtracted from the amount of nitrogen monoxide gas supplied, thereby obtaining the amount of nitrogen monoxide gas adsorbed on the $Ni^{2+}$-exchanged beta zeolite per unit mass (mmol/g). The results are shown in Table 1 below.

[Measurement Conditions of Thermal Conductivity-Type Gas Chromatograph (GC-TCD)]

Carrier gas: Helium gas
Flow rate of carrier gas: 30 cm$^3$·min$^{-1}$
Temperature of detection part: 100° C.
Current of detection part: 80 mA Example 2

Figure 6:
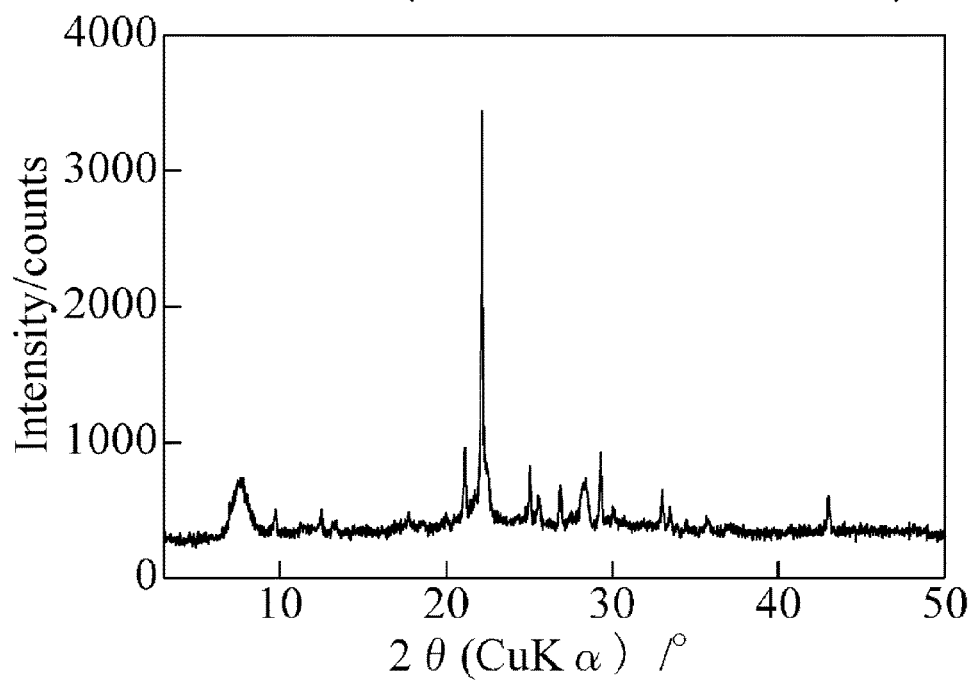
FIG. 6 is an X-ray diffraction diagram of a $Co^{2+}$-exchanged beta zeolite that was obtained in Example 2.
Figure 7:
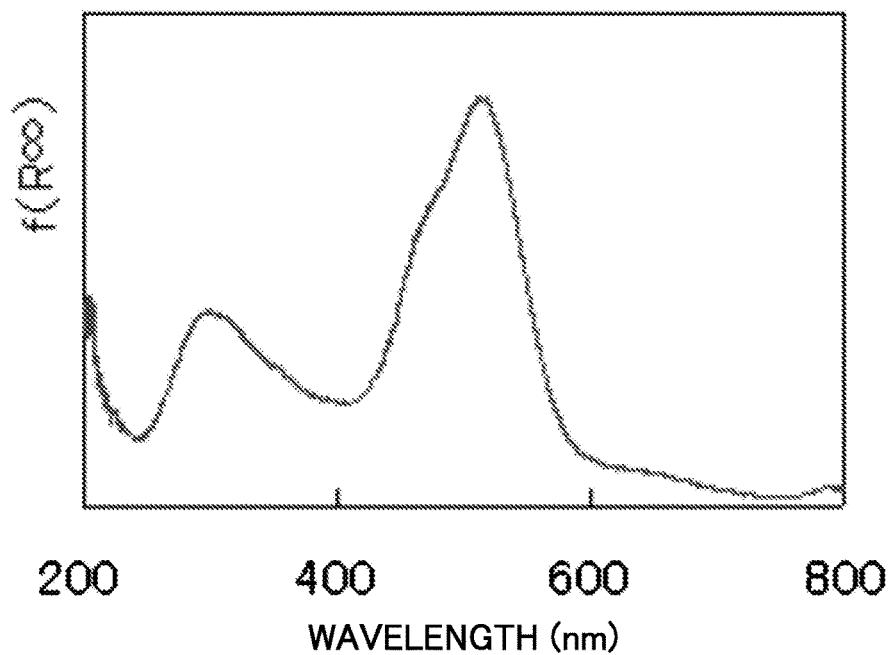
FIG. 7 is a spectrum of a $Co^{2+}$ beta zeolite that was obtained in Example 2 as a function of Kubelka-Munk.

A $Co^{2+}$-exchanged beta zeolite which carried 0.98 mmol/g of $Co^{2+}$ was obtained in the same manner as in Example 1, except that 30 ml of 0.3 mol/L of Co $(NO_3)_2$·6$H_2O$ aqueous solution was added instead of Ni $(NO_3)_2$·6$H_2O$ aqueous solution added in the step (2) of Example 1. The X-ray diffraction diagram of the obtained $Co^{2+}$-exchanged beta zeolite is shown in FIG. 6. In addition, the spectrum of the intensity of the Kubelka-Munk function f (R∞) of the obtained $Co^{2+}$-exchanged beta zeolite is shown in FIG. 7. As shown in FIG. 7, this spectrum of the intensity of the Kubelka-Munk function f (R∞) had the maximal intensity in the wavelength range from 300 to 600 nm which was larger than the maximal intensity in the wavelength range from 200 to 250 nm. Specifically, the maximal intensity in the wavelength range from 200 to 250 nm was 0.0256, and the maximal intensity in the wavelength range from 300 to 600 nm was 0.0498. Further, the obtained $Co^{2+}$-exchanged beta zeolite was evaluated in the same manner as in Example 1. The results are shown in Table 1.

Comparative Example 1

Figure 8:
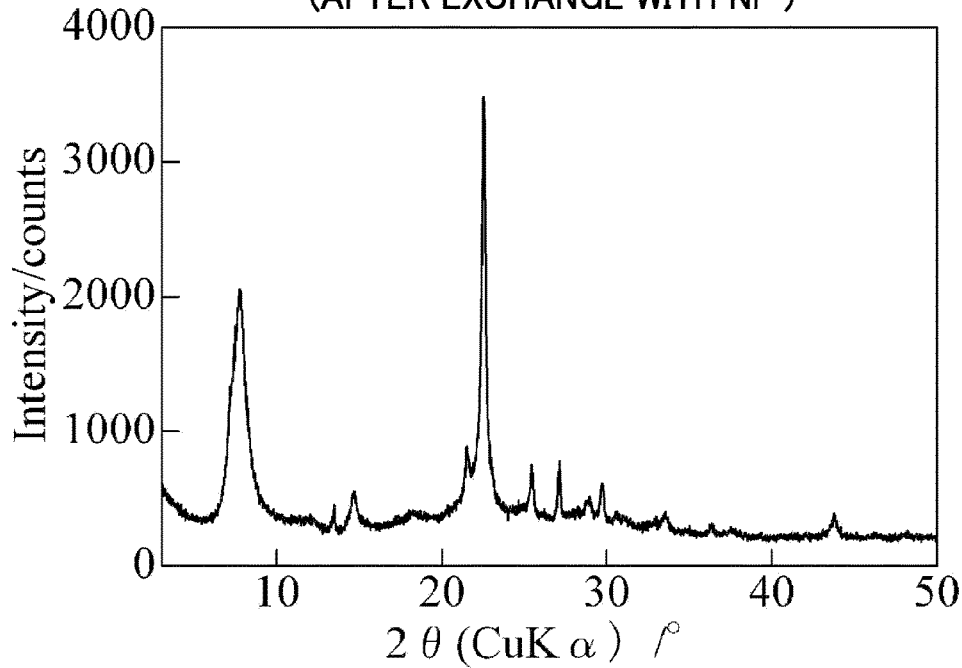
FIG. 8 is an X-ray diffraction diagram of a $Ni^{2+}$ beta zeolite that was obtained in Comparative Example 1.

As a beta zeolite before $M^{n+}$-exchange, a beta zeolite which had been changed to an Na-type beta zeolite from an $H^+$-type beta zeolite manufactured by TOSOH CORPORATION (the model number HSZ-940HOA, synthesized using an SDA, $SiO_2/Al_2O_3$=35) was used. Except for this, in the same manner as in Example 1, a $Ni^{2+}$-exchanged beta zeolite was obtained. The X-ray diffraction diagram of the obtained $Ni^{2+}$-exchanged beta zeolite is shown in FIG. 8. The obtained $Ni^{2+}$-exchanged beta zeolite was evaluated in the same manner as in Example 1, in terms of the adsorption of nitrogen monoxide gas. The results are shown in Table 1.

Comparative Example 2

Figure 9:
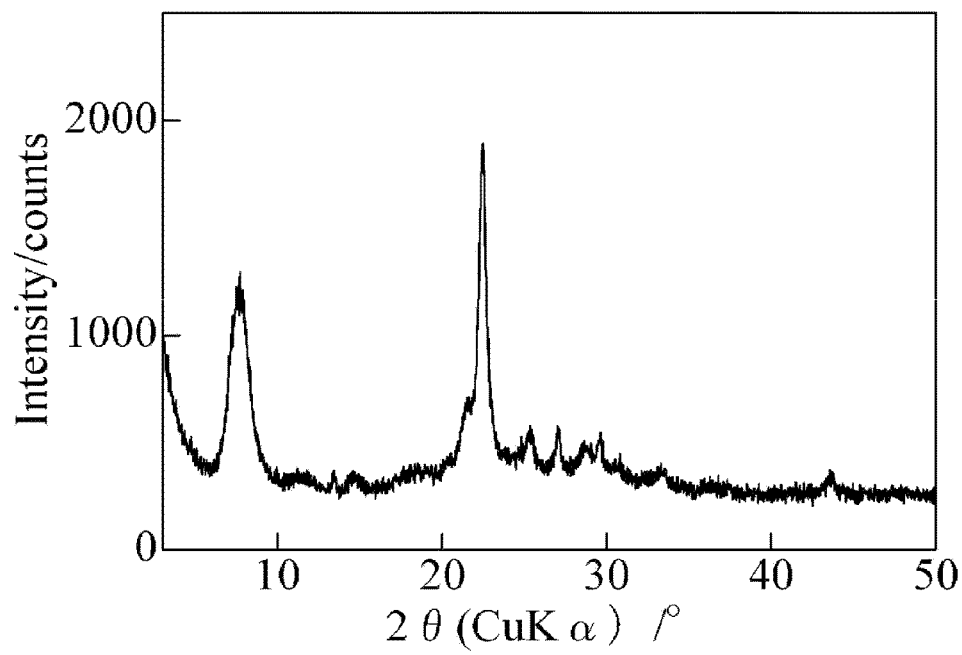
FIG. 9 is an X-ray diffraction diagram of a $Co^{2+}$ beta zeolite that was obtained in Comparative Example 2.
Figure 10:
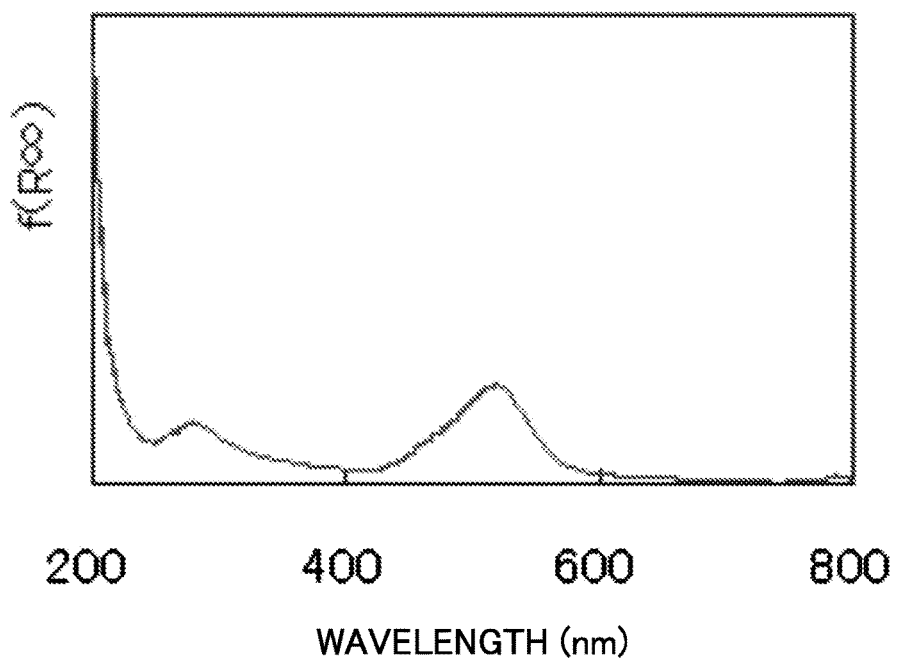
FIG. 10 is a spectrum of a $Co^{2+}$ beta zeolite that was obtained in Comparative Example 2 as a function of Kubelka-Munk.

As a beta zeolite before $M^{n+}$-exchange, the seed crystal of the beta zeolite used in Example 1 was used. Except for this, in the same manner as in Example 2, a $Co^{2+}$-exchanged beta zeolite was obtained. The X-ray diffraction diagram of the obtained $Co^{2+}$-exchanged beta zeolite is shown in FIG. 9. In addition, the spectrum of the intensity of the Kubelka-Munk function f (R∞) of the obtained $Co^{2+}$-exchanged beta zeolite is shown in FIG. 10. As shown in FIG. 10, the spectrum of the intensity of the Kubelka-Munk function f (R∞) had the maximal intensity in the wavelength range from 300 to 600 nm which was smaller than the maximal intensity in the wavelength range from 200 to 250 nm. Specifically, the maximal intensity in the wavelength range from 200 to 250 nm was 0.0544, and the maximal intensity in the wavelength range from 300 to 600 nm was 0.0127. Further, the obtained $Co^{2+}$-exchanged beta zeolite was evaluated in the same manner as in Example 1, in terms of the adsorption of nitrogen monoxide gas. The results are shown in Table 1.

Comparative Example 3

Figure 11:
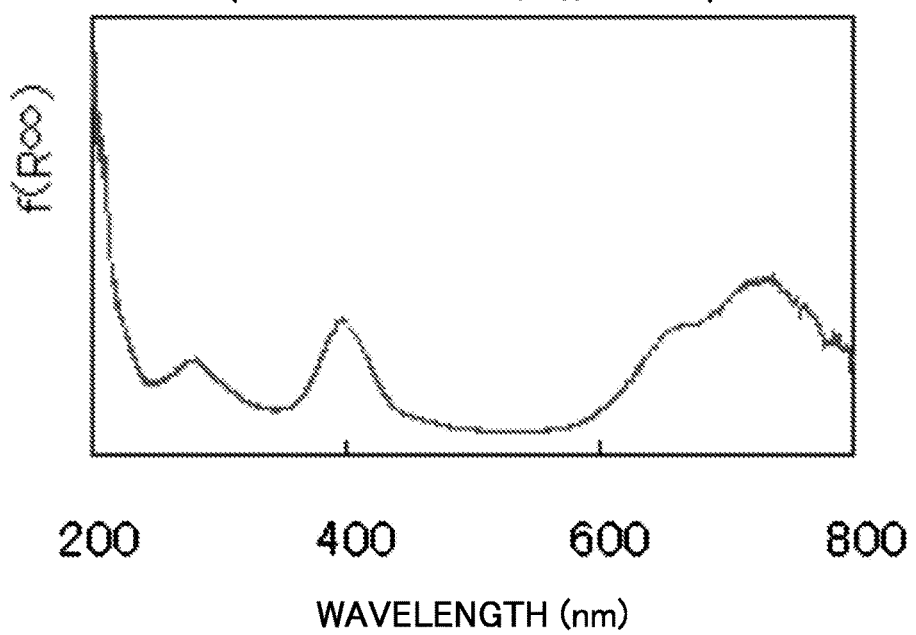
FIG. 11 is a spectrum of a $Ni^{2+}$ beta zeolite that was obtained in Comparative Example 3 as a function of Kubelka-Munk.
Figure 12:
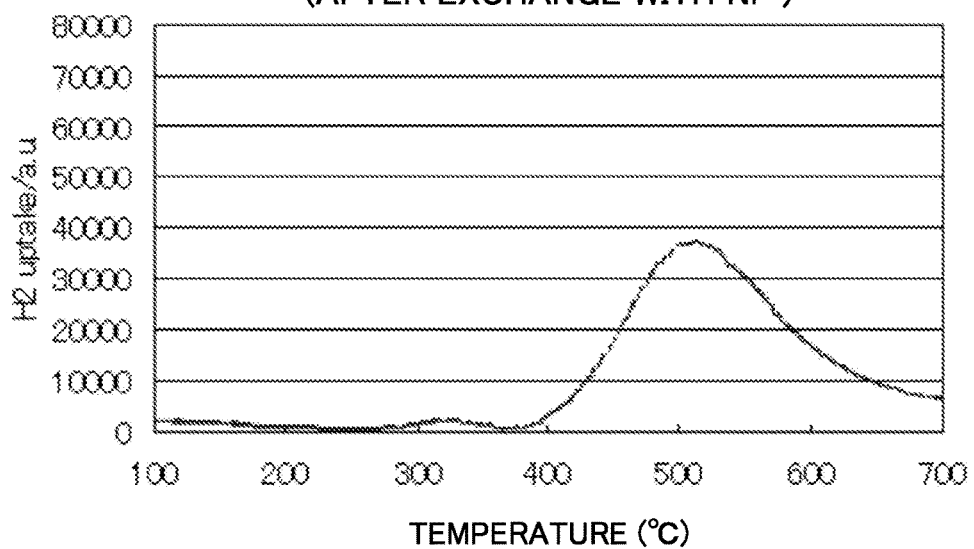
FIG. 12 shows hydrogen uptake of a $Ni^{2+}$ beta zeolite that was obtained in Comparative Example 3.

As a beta zeolite before $M^{n+}$-exchange, the seed crystal of the beta zeolite used in Example 1 was used. Except for this, in the same manner as in Example 1, a $Ni^{2+}$-exchanged beta zeolite was obtained. The spectrum of the intensity of the Kubelka-Munk function f (R∞) of the obtained $Ni^{2+}$-exchanged beta zeolite is shown in FIG. 11. As shown in FIG. 11, the spectrum of the intensity of the Kubelka-Munk function f (R∞) had the maximal intensity in the wavelength range from 300 to 600 nm which was smaller than the maximal intensity in the wavelength range from 200 to 250 nm. Specifically, the maximal intensity in the wavelength range from 200 to 250 nm was 0.0323, and the maximal intensity in the wavelength range from 300 to 600 nm was 0.0145. In addition, the variation curve of the hydrogen consumption amount of the obtained $Ni^{2+}$-exchanged beta zeolite is shown in FIG. 12. As shown in FIG. 12, the hydrogen consumption amount of the $Ni^{2+}$-exchanged beta zeolite has a peak around 520° C. which is at a higher temperature that the peak temperature of the hydrogen consumption amount of the $Ni^{2+}$-exchanged beta zeolite obtained in Example 1. Further, the obtained $Ni^{2+}$-exchanged beta zeolite was evaluated in the same manner as in Example 1, in terms of the adsorption of nitrogen monoxide gas. The results are shown in Table 1.

TABLE 1

| | Beta zeolite before substitution | | | | $M^{n+}$-substituted beta zeolite | | | | | |
|---|---|---|---|---|---|---|---|---|---|---|
| | $SiO_2/Al_2O_3$ | BET specific surface area (m$^2$/g) | Micropore specific surface area (m$^2$/g) | Micropore volume (cm$^3$/g) | $SiO_2/Al_2O_3$ | BET specific surface area (m$^2$/g) | Micropore specific surface area (m$^2$/g) | Micropore volume (cm$^3$/g) | $M^{2+}$ | Amount of $Mn^+$ carried (mmol/g) | Amount of NO adsorbed (mmol/g) |
| Example 1 | 8 | 544 | 365 | 0.192 | 9 | 502 | 328 | 0.173 | $Ni^{2+}$ | 1.01 | 0.245 |
| Example 2 | 8 | 544 | 365 | 0.192 | 8 | 483 | 349 | 0.184 | $Co^{2+}$ | 0.98 | 0.287 |
| Comparative Example 1 | 35 | 480 | 291 | 0.153 | 35 | 592 | 324 | 0.170 | $Ni^{2+}$ | 0.24 | 0.034 |
| Comparative Example 2 | 24 | 588 | 421 | 0.222 | 23 | 617 | 355 | 0.187 | $Co^{2+}$ | 0.43 | 0.080 |
| Comparative Example 3 | 24 | 588 | 421 | 0.222 | 26 | 555 | 282 | 0.148 | $Ni^{2+}$ | 0.44 | 0.055 |

As is apparent from the results shown in Table 1, it is understood that nitrogen monoxide gas can be adsorbed and removed by using the $M^{n+}$-exchanged beta zeolite obtained in each Example more efficiently compared to a case of using the $M^{n+}$-exchanged beta zeolite obtained in each Comparative Example. It is also understood that nitrogen monoxide gas can be efficiently adsorbed and removed at room temperature.

The invention claimed is:

1. An $M^{n+}$-exchanged beta zeolite which has been ion-exchanged with an $M^{n+}$ ion (wherein $M^{n+}$ represents an n-valent metal cation; n represents a numerical value of 1 to 3; and M represents an element selected from the group consisting of Ni, Co, Cu Mn, Zn, Sn, Ag, Li, K, Cs, Au, Ca, Mg, Pt, Pd, Rh and Ir), in which:

$SiO_2/Al_2O_3$ ratio ranges from 7 to 18; a BET specific surface area ranges from 400 to 700 m$^2$/g; a micropore specific surface area ranges from 290 to 500 m$^2$/g; a micropore volume ranges from 0.15 to 0.25 cm$^3$/g, and the intensity of the Kubelka-Munk function f (R∞) obtained by Ultraviolet-visible spectroscopy shows the maximal intensity in the wavelength range from 300 to 600 nm which is larger than the maximal intensity in the wavelength range from 200 to 250 nm.

2. The $M^{n+}$-exchanged beta zeolite according to claim 1, wherein the amount of the $M^{n+}$ ion relative to the amount of the $M^{n+}$-exchanged beta zeolite ranges from 0.01 to 2.5 mmol/g.

3. The $M^{n+}$-exchanged beta zeolite according to claim 1, wherein a beta zeolite, in which an $SiO_2/Al_2O_3$ ratio ranges from 7 to 18, a BET specific surface area that is measured in the form of a sodium-type beta zeolite ranges from 400 to 700 m$^2$/g, a micropore specific surface area that is measured in the form of a sodium-type beta zeolite ranges from 250 to 500 m$^2$/g, and a micropore volume that is measured in the form of a sodium-type beta zeolite ranges from 0.15 to 0.25 cm$^3$/g, is used as a beta zeolite before having been ion-exchanged with the $M^{n+}$ ion.

4. The $M^{n+}$-exchanged beta zeolite according to claim 2, wherein a beta zeolite, in which an $SiO_2/Al_2O_3$ ratio ranges from 7 to 18, a BET specific surface area that is measured in the form of a sodium-type beta zeolite ranges from 400 to 700 m$^2$/g, a micropore specific surface area that is measured in the form of a sodium-type beta zeolite ranges from 250 to 500 m$^2$/g, and a micropore volume that is measured in the form of a sodium-type beta zeolite ranges from 0.15 to 0.25 cm$^3$/g, is used as a beta zeolite before having been ion-exchanged with the $M^{n+}$ ion.

5. The $M^{n+}$-exchanged beta zeolite according to claim 1, wherein a hydrogen consumption amount when the temperature of the $M^{n+}$-exchanged beta zeolite increases at the rate of 10° C./min under the mixed gas atmosphere consisting of 5 vol % of hydrogen and 95 vol % of helium has a peak at a temperature of 400° C. or less.

6. The $M^{n+}$-exchanged beta zeolite according to claim 2, wherein a hydrogen consumption amount when the temperature of the $M^{n+}$-exchanged beta zeolite increases at the rate of 10° C./min under the mixed gas atmosphere consisting of 5 vol % of hydrogen and 95 vol % of helium has a peak at a temperature of 400° C. or less.

7. The $M^{n+}$-exchanged beta zeolite according to claim 3, wherein a hydrogen consumption amount when the temperature of the $M^{n+}$-exchanged beta zeolite increases at the rate of 10° C./min under the mixed gas atmosphere consisting of 5 vol % of hydrogen and 95 vol % of helium has a peak at a temperature of 400° C. or less.

8. The $M^{n+}$-exchanged beta zeolite according to claim 4, wherein a hydrogen consumption amount when the temperature of the $M^{n+}$-exchanged beta zeolite increases at the rate of 10° C./min under the mixed gas atmosphere consisting of 5 vol % of hydrogen and 95 vol % of helium has a peak at a temperature of 400° C. or less.

9. A gas adsorbent comprising the $M^{n+}$-exchanged beta zeolite according to claim 1.

10. A gas adsorbent comprising the $M^{n+}$-exchanged beta zeolite according to claim 2.

11. A gas adsorbent comprising the $M^{n+}$-exchanged beta zeolite according to claim 3.

12. A gas adsorbent comprising the $M^{n+}$-exchanged beta zeolite according to claim 4.

13. The gas adsorbent according to claim 9, which is used in the adsorption of nitrogen monoxide.

14. A method for producing an $M^{n+}$-exchanged beta zeolite, which comprises the steps of dispersing a beta zeolite, in which an $SiO_2/Al_2O_3$ ratio ranges from 7 to 18, a BET specific surface area that is measured in the form of a sodium-type beta zeolite ranges from 400 to 700 m$^2$/g, a micropore specific surface area that is measured in the form of a sodium-type beta zeolite ranges from 250 to 500 m$^2$/g and a micropore volume that is measured in the form of a sodium-type beta zeolite ranges from 0.15 to 0.25 cm$^3$/g, in an aqueous solution of an n-valent metal wherein the concentration of a water-soluble compound of the n-valent metal is 0.3 to 1.0 mol/L, so that the proportion of the beta zeolite is 0.5 to 7 parts by mass based on 100 parts by mass of the aqueous solution; and then mixing the dispersion under stirring to cause said beta zeolite to carry an $M^{n+}$ ion (wherein $M^{n+}$ represents an n-valent metal cation; n represents a numerical value of 1 to 3; and M represents an element selected from the group consisting of Ni, Co, Cu, Mn, Zn, Sn, Ag, Li, K, Cs, Au, Ca, Mg, Pt, Pd, Rh and Ir), wherein the intensity of the Kubelka-Munk function f (R∞) obtained by Ultraviolet-visible spectroscopy shows the maximal intensity in the wavelength range from 300 to 600 nm which is larger than the maximal intensity in the wavelength range from 200 to 250 nm.

15. A method for removing nitrogen monoxide, which comprises of:

bringing an $M^{n+}$-exchanged beta zeolite into contact with nitrogen monoxide or a nitrogen monoxide-containing gas to cause nitrogen monoxide to be adsorbed on said $M^{n+}$-exchanged beta zeolite, wherein, said $M^{n+}$-exchanged beta zeolite has been ion-exchanged with an $M^{n+}$ ion (wherein $M^{n+}$ represents an n-valent metal cation; n represents a numerical value of 1 to 3; and M represents an element selected from the group consisting of Ni, Co, Cu, Mn, Zn, Sn, Ag, Li, K, Cs, Au, Ca, Mg, Pt, Pd, Rh and Ir), and wherein, $SiO_2/Al_2O_3$ ratio ranges from 7 to 18, a BET specific surface area ranges from 400 to 700 m$^2$/g, a micropore specific surface area ranges from 290 to 500 m$^2$/g, and a micropore volume ranges from 0.15 to 0.25 cm$^3$/g, in said $M^{n+}$-exchanged beta zeolite.

* * * * *